United States Patent Office

3,702,880
Patented Nov. 14, 1972

3,702,880
METHOD OF USING A ZINC CHLORIDE AQUEOUS SOLUTION THROUGH CIRCULATION AND OF PURIFYING THEREOF
Fukusaburo Matsushita, Yasuo Saji, Kazuhisa Saito, Kozo Tanaka, and Osamu Yoshinari, Shizuoka, Japan, assignors to Toho Beslon Co., Ltd., Tokyo, Japan
No Drawing. Filed Apr. 8, 1970, Ser. No. 26,776
Claims priority, application Japan, Apr. 8, 1969, 44/27,045
Int. Cl. D01f 7/08
U.S. Cl. 264—38  5 Claims

ABSTRACT OF THE DISCLOSURE

Improvement in solution polymerization process for the production of acrylic fibers, which polymerization is carried out in the presence of a reaction medium comprising concentrated aqueous zinc chloride solution, which solution is recycled to the polymerization after the spinning operation, comprising purification of the solution by selectively controlled oxidation processes to maintain the proportions of organic impurities below specifically defined levels prior to such recycling.

BACKGROUND OF THE INVENTION

(1) Field of the invention

The present invention relates to a method of solution polymerization and spinning to produce acrylic fiber using a concentrated inorganic aqueous salt solution comprising zinc chloride as the solvent. It provides an effective method of purifying the salt solution recovered from a coagulating and washing bath after spinning so as to reuse the salt solution repeatedly, as well as a method for detecting the amount of organic impurities accumulated in the said solution.

(2) Description of the prior art

In the production of acrylic fiber, a concentrated aqueous inorganic salt solution having zinc chloride as the major component is an excellent solvent and the use of said concentrated inorganic aqueous salt solution as a medium for effecting solution polymerization is well known. It is, in fact, actually in practical use on commercial basis.

In order to economically produce acrylic fiber on a commercial scale employing such inorganic concentrated aqueous salt solution as a polymerization medium, it is essential to recover the aqueous salt solution for circulation and reuse. In order to attain this object, it is widely practiced to spin an original spinning solution comprising said concentrated aqueous salt solution into a coagulating bath consisting of a dilute solution of the said salt solution, which concentration is appropriately maintained to the extent necessary for the formation of fiber and, thereafter, to recover and concentrate an inorganic salt from the coagulating bath and a water-washing bath. The inorganic salt may then be reused as a polymerization medium.

However, in the recovery of the inorganic salt from the coagulating bath and the washing bath, the problem is generally encountered that unreacted monomer, low molecular weight polymer formed during the polymerization, particularly during the last stage thereof, and other organic materials tend to accompany said inorganic salt.

Some of these materials mixed in with the inorganic salt are volatile and may be removed from said inorganic salt in a concentration step, while the high boiling point and non-volatile organic materials remain as organic impurities in the inorganic salt solution.

It has heretofore been confirmed that such organic impurities will adversely affect the behaviour of solution polymerization, the quality of formed polymer solution and the produced fiber. As a method of eliminating these disadvantages, oxidation treatments have been proposed in Japanese patent application publication Nos. 16,932/1967 and 27,248/1967 and elsewere, which have contributed to eliminate certain of the above organic materials.

However, applicants have discovered that, in a method which repeatedly re-uses a recovered concentrated aqueous salt solution having zinc chloride as the major component, certain organic materials tend to accumulate, even though the recovered solution is subjected to the conventionally practiced oxidation treatment.

That is to say, organic materials in the inorganic salt solution are not only removed due to decomposition by the oxidation treatment, but also form organic intermediate products. These intermediate products are then not further decomposable even by increasing the amount of oxidizing agent employed.

Thus, when re-using such solutions in many cycles of solution polymerization, said intermediate products will accumulate in the solvent and act to degrade the quality of the polymerization product and the spun fiber. Said intermediates also have been found to adversely affect the spinning operation.

It is, needless to say, highly desirable to completely eliminate such impurities from the recovered aqueous salt solution and means for such removal have long been sought in the art. However, economical considerations have precluded complete purification in commercial operations.

DETAILED DESCRIPTION OF THE INVENTION

Applicants have additionally discovered, however, that there are definite limitations as to the type and amounts of such impurities which may be tolerated in the solution polymerization and subsequent spinning processes.

That is to say, in a system wherein a concentrated aqueous salt solution having zinc chloride as a major component is incorporated as a solvent, and said solvent is repeatedly recirculated for use as a solution polymerization medium for effecting the production of acrylonitrile polymer, the amount and types of organic materials remaining after carrying out a purification treatment of said solvent may be indicated by means of certain characterization values.

Applicants have confirmed the presence of over twenty kinds of intermediate compounds in a recovered aqueous salt solution employed in the polymerization of a single comonomer. The kind and amount of these organic materials may, however, vary depending on the kinds and amount of monomers, such as, for instance, methyl acrylate, methyl methacrylate, acrylamide, vinyl acetate and the like as the second components in case of a ternary copolymer incorporating, for example, acrylonitrile as the main component, and also depending on the use of aryl sulfonic acid (sulfonate), methacrylic acid (methacrylate), vinyl benzene sulfonic acid (sulfonate) and the like as the third component thereof. Variation will also occur depending on the kind of polymerization initiator used, for example, catalysts of hydrogen peroxide, ammonium persulfate, sodium persulfate and the like, or redox catalysts consisting of said oxidizing agents and such reducing agents as sodium methasulfite and the like. As can be readily seen from the foregoing, the degree of variation cannot be predicted accurately, but depends upon many reaction variables.

Applicants have adopted certain methods of measuring the content of said organic materials as respective groups and of classifying them into typical groups of each type.

As a result of studying the characterization values of various recovered solvents and the relationship betewen said characterization values and the effects of the solvents upon the behavior of solution polymerization, spinning properties and also the effects upon the fiber capabilities, they have discovered that in order to obtain stabilized polymerization and spinning conditions and an excellent product, irrespective of the comonomer employed, it is required that each of the following characterization values must be satisfied.

Value A: below 1500
Value B: below 500
Value C: below 600

The characterization values indicated in the above column were measured in accordance with the following analytical methods.

Value A.—A 5 ml. solvent sample is collected into a conical flask, into which 40 ml. of distilled water and 50 ml. of 25 percent by weight aqueous sodium hydroxide are added, followed by intimate blending. Thereafter, 50 ml. of a 0.05 N standard solution of potassium permanganate is added to said conical flask, which is then equipped with a cooling tube, the mixture is then boiled for 60 minutes and immediately subjected to cooling in water.

Thereafter, 45 ml. of sulfuric acid (1+3) (said sulfuric acid (1+3) means a mixed solution of 1 volume of concentrated sulfuric acid to 3 volumes water) is added, followed by 25 ml. of a manganese sulfate solution prepared as below [1] and intimate blending of the resulting mixture. 50 ml. of a standard 0.05 N ammonium ferrous sulfate solution is then added, the mixture is then titrated with a standard 0.05 N potassium permanganate solution. The titration comes to an end at the point at which the color of the blended solution turns pink.

A control test is also carried out under the same conditions as above. From the ml. (a) of the standard potassiume permanganate solution used for carrying out the control test and from the ml. (b) of the standard potassium permanganate used in the test containing the solvent sample, the amount of oxygen consumption (mg./l.) at a high pH value to be derived from the potassium permanganate solution can be obtained by reference to the following formula:

$$\text{Value A} = \frac{(b-a) \times 0.40 \times 1000}{5}$$

Value B.—5 ml. of a sample solution is collected into a conical flask, to which 100 ml. of pure water and 3 ml. of 25 percent by weight aqueous sodium hydroxide are added, followed by intimate blending. Thereafter, 25 ml. of a 0.05 N standard potassium permanganate solution is added. The blended solution in the flask is then equipped with a cooling tube and is boiled for 25 minutes, the flask then being immediately cooled in water. Thereafter, 3 ml. of sulfuric acid (1+3) is added to said blended solution followed by carrying out further intimate blending and 25 ml. of a 0.05 N standard ammonium ferrous sulfate solution is added, followed by titration as in the case of Value A. Accordingly, the amount of oxygen consumption (mg./l.) is calculated by a potassium permanganate solution. The calculation formula therefor is as follows, the values of $a$ and $b$ being as stated previously:

$$\text{Value B} = \frac{(b-a) \times 0.40 \times 1000}{5}$$

[1] Preparation of the manganese sulfate solution: 70 g. of manganese sulfate is dissolved into 200 ml. of water. 175 ml. of phosphoric acid is added thereto, to which is also added 240 ml. of aqueous sulfuric acid (1:1 by volume) under agitation. After cooling the solution, water is added to make 1 liter.

Value C.—10 ml. of a solvent sample solution is diluted into 500 ml. of pure water. To 10 ml. of the resulting solution is added 10 ml. each of a standard potassium chromate solution (11.0 mg./l.) and a manganese sulfate solution [see [1] above], followed intimate blending. Thereafter, reaction is carried out at room temperature for 30 minutes.

To the resulting solution is further added 2 ml. of a 0.2% solution of diphenyl carbazide in ethyl alcohol and 4 ml. of aqueous hydrochloric acid (1+1) [said "hydrochloric acid (1+1)" meaning a mixture of 1 volume concentrated hydrochloric acid (35% by weight) to 1 volume water]. Said resulting solution is allowed to sit for 10 minutes. Thereafter, by use of a colorimeter, the pink absorbance exhibited is measured at a wave length of 550 m$\mu$ with the incorporation of pure water as a contrast solution. Thereafter, by the use of the correlation curve of the number of mg. of potassium chromate and absorbance at a wave length of 550 m$\mu$ previously prepared under the same conditions as preceding, the amount of remaining potassium chromate is calculated, and the obtained result is represented in the form of the amount of potassium chromate consumption in grams per 1 liter of the sample solvent.

According to an extensive study by applicants, it has been clearly concluded that, in the case of repeatedly using a recirculated concentrated aqueous salt solution having zinc chloride as the major component thereof as a solution polymerization medium in the production of acrylonitrile polymers and also as a spinning solvent, organic impurities accumulate and the aforementioned Values of A, B and C will gradually increase according to the use through circulation. Therefore, unless purification is effected with respect to the recovered solvent, Values A, B and C will exceed 1500, 500 and 600, respectively, after being employed in the polymerization and spinning operations from 10 to 15 times, as shown below.

TABLE 1.—EFFECT OF REPEATED RECIRCULATION OF SOLVENT ON THE VARIATION OF CHARACTERIZATION VALUES

| Frequency of use | Characterization value | | |
| --- | --- | --- | --- |
| | Value A | Value B | Value C |
| 0 | 30 | 0 | 0 |
| 2 | 190 | 100 | 60 |
| 5 | 480 | 260 | 170 |
| 10 | 1,100 | 540 | 330 |
| 15 | 1,650 | 810 | 570 |
| 20 | 2,230 | 1,030 | 810 |

When Value A exceeds 1500, transparency of the polymer solution and whiteness of the fiber will be lowered. when Value B exceeds 500, polymerization yield and degree of polymerization obtained is lowered. Further, the removal of iron ion, which becomes dissolved during the polymerization, spinning and the solvent recovery steps will be rendered difficult, thus resulting in the unfeasibility of effecting the production of the acrylic fiber of high quality.

Tables 2 and 3 represent the influence of Value A on the transparency of the polymer solution and the whiteness of the fiber and the influence of Value B upon the ease of removal of iron ion, respectively.

TABLE 2

[Influence of Value A upon transparency of the polymer solution and the whiteness of the fiber]

| Value A | Transparency of the polymer solution (percent) | Whiteness of the fiber |
| --- | --- | --- |
| 290 | 63 | 0.80 |
| 650 | 57 | 0.78 |
| 840 | 57 | 0.76 |
| 1,250 | 55 | 0.76 |
| 1,700 | 43 | 0.67 |
| 1,950 | 37 | 0.63 |

TABLE 3

Influence of Value B upon iron ion (in the case where iron is originally present in the solvent in the dissolved state in the amount of 4 p.p.m.)

| Value B: | Removal amt. of iron (p.p.m.) |
|---|---|
| 100 | 3.1 |
| 230 | 2.5 |
| 450 | 1.3 |
| 550 | 0.2 |
| 700 | 0 |
| 850 | 0 |

Further, when the Value C is above 600, the spinning properties will be degraded, with the result that the spun gel-fiber tends to break during coagulation, washing and stretching. As shown in Table 4 below, the use of a spinning nozzle over a long period of time also becomes difficult, thus resulting in the unfeasibility of effecting the stable production of fiber.

TABLE 4

Influence of Value C upon the length of time the spinning nozzle may be used

| Value C: | Useable period of time (hours) |
|---|---|
| 100 | 170 |
| 300 | 170 |
| 500 | 165 |
| 650 | 130 |
| 900 | 95 |
| 1150 | 45 |
| 1600 | 15 |

As is clear from these fundamental studies, the essential characteristics of the present invention reside in estimating the organic impurities accumulating in a solvent to be circulated in carrying out the commercial production of an acrylic fiber, which process employs a solvent which is a concentrated aqueous salt solution. It has been confirmed that, when all of the characterization values in the recovered aqueous salt solution are controlled within the permissible range mentioned above, the production of fibers can be carried out normally without any trouble caused by such organic impurities.

In other words, these values are considered to be extremely significant in this regard. The characterization Values A, B and C represent the amounts of the various types of organic materials present. That is to say, Value A indicates substantially all of the active organic material, Value B relates to certain types of organic intermediate compound and, further, Value C relates to specified intermediate compounds present in the organic material represented by said Values A and B. Among these values there occasionally occurs a proportional relationship for a given polymerization. However, such is not always the case. For instance, even when Value A is constant, Values B and C may vary. Even further, when Value B is constant, Values A and C may from time to time be subject to great variation. Consequently, it is necessary to measure each one of the values individually, and only when the resulting values fall within the ranges mentioned above, it will be possible to attain satisfactory results.

This invention is also directed to a method of carrying out an excellent oxidation treatment in an attempt to keep the characterization values of said solvent within the permissible range set forth above. In a system wherein a concentrated aqueous salt solution having zinc chloride as a major component thereof is used as a solution polymerization medium for effecting the production of an acrylonitrile polymer, and where repeated use of the solvent is effected by way of recovery and recirculation, the use of the conventionally practiced oxidation method will not be sufficient to maintain the characterization values within the above permissible ranges, as pointed out above.

Various different intermediate products are formed during such oxidations, depending on the pH values at the time of effecting the oxidation treatment, some of which can not be decomposed and removed, when the oxidation treatment is carried out at an unsuitable pH value. It has been confirmed that said undecomposed and unremovable organic matters will result in accumulating in the solvent.

The present invention is directed to a method of removing said organic materials by effecting an oxidation treatment employing oxidizing agents, such as hydrogen peroxide, water-soluble persulfate, sodium hypochlorite, sodium chlorate, sodium perchlorate and the like, but effecting said treatment in two steps, one being carried out at a concentration of inorganic basic salt of below 0.10 percent by weight, based on said solvent in an acidified condition and the other being carried out at a concentration of basic salt above 0.10 percent by weight, preferably at above 0.20 percent by weight. the pH of said solvent can be adjusted by addition of basic salt.

The method for effecting the measurement concentration of the inorganic basic salt is based on the standard designated as JISK 1428 and JISK 8111 respectively. A concentrated zinc chloride aqueous solution is prepared by mixing approximately 100 ml. of water and 10 grams of zinc chloride. After the solution is formed, several drops (0.1%) of a methyl orange solution as an indicator is added, followed by titration with 1 N hydrochloric acid. Calculation according to the following formula from the point of color change of the indicator to determine the desired concentration.

$$C = \frac{0.041D}{S} \times 100$$

C: Basic salt concentration (percent by weight).
S: Weight of sample (g).
D: 1 N hydrochloric acid amount in use (ml.).

The concentration of the basic salt present in the solution to be treated has an extremely important influence on effect of the oxidation treatment.

When the oxidation treatment is carried out in the presence of a concentration of basic salt in the recovered aqueous salt solution higher than 0.20%, it is impossible to lower Value C even though it may be possible to effect the lowering of Values A and B. It has been found that, at times, Value C will even increase under such circumstances.

That is to say, when an oxidation treatment is carried out with respect to an aqueous salt solution whose concentration of basic salt is above 0.20%, it is possible to lower both Values A and B, but is not possible to lower Value C.

In another aspect, when the oxidation treatment is carried out at basic salt concentrations below 0.10% or in the presence of an acid, such as hydrochloric acid, it is possible to lower Value C, but the lowering of Values A and B is difficult.

As a consequence, a combination of oxidation treatments as set forth above is required in order to maintain the respective characterization values of aqueous salt solutions within the permissible ranges.

In effecting said combination treatment, it is necessary either to carry out an oxidation treatment under different conditions of concentration of basic salt in series or in parallel, or to carry out the oxidation treatment under each condition alternately at the time of effecting the purification of the aqueous salt solution to be circulated.

Should the oxidation treatment be carried out repeatedly under only one of the aforesaid concentration conditions, one or more of the characterization values will necessarily increase. by the combination treatment, however, the maintenance of the required characterization values can be obtained and the solvent soltuion can safely be recycled to the polymerization and spinning operations to obtain satisfactory and economical results.

The following examples will further illustrate the present invention, wherein all proportions are by weight unless otherwise indicated.

EXAMPLE 1

1000 parts of an aqueous salt solution having a Value A of 1200, a value B of 400 and a Value C of 500 and consisting of 55% zinc chloride, 3% sodium chloride and 42% water is used as a solution polymerization medium. 89 parts of acrylonitrile, 9.5 parts of methyl acrylate and 1.5 parts of sodium methacryl sulfonate are added to the medium and intimately mixed with one another. 0.2 part of hydrogen peroxide is used as the polymerization initiator. The thus formed polymer solution is used as an original spinning solution, and said solution is spun out through a nozzle into an aqueous coagulating bath, the composition of which was adjusted to 20% zinc chloride and 1% sodium chloride, to form the desired fibers. The concentration of the coagulating bath is adjusted by the amount of water infused from a washing bath.

In order to recover the inorganic salt solution from the coagulating bath and the washing bath, overflow liquid is removed from the coagulating bath, and this overflow solution is concentrated to about 60% inorganic salt by evaporation of the water. The concentrated solution is then treated according to one of three oxidation methods, as shown in Table 5 below. In addition, other necessary purifications and adjustments are carried out for reuse of the solution as a polymerization medium.

TABLE 5

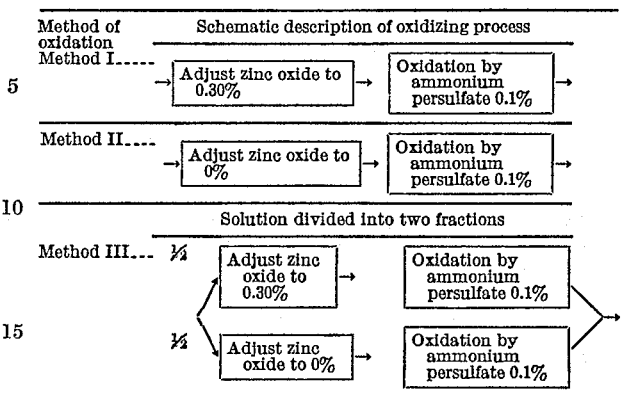

As a result of repeating the cycle of polymerization spinning recovery and the above-identified oxidation treatment ten (10) times, it was found that the characterization values of said solvent were as shown in Table 6.

TABLE 6

| Characterization values | Oxidation method | Prior to treatment | 2d time | 4th time | 6th time | 8th time | 10th time |
|---|---|---|---|---|---|---|---|
| Value A | Method I | 1,200 | 1,190 | 1,200 | 1,180 | 1,180 | 1,180 |
|  | Method II | 1,200 | 1,350 | 1,480 | 1,600 | 1,820 | 1,900 |
|  | Method III | 1,200 | 1,210 | 1,220 | 1,210 | 1,210 | 1,220 |
| Value B | Method I | 400 | 400 | 390 | 390 | 390 | 390 |
|  | Method II | 400 | 480 | 540 | 590 | 620 | 680 |
|  | Method III | 400 | 410 | 400 | 400 | 410 | 410 |
| Value C | Method I | 500 | 580 | 650 | 720 | 810 | 900 |
|  | Method II | 500 | 410 | 330 | 270 | 220 | 190 |
|  | Method III | 500 | 520 | 520 | 510 | 520 | 510 |

The results obtained with respect to the polymerization, spinning, etc. are shown in Table 7.

TABLE 7

| Oxidation method | Purification and polymerization circumstances | Spinning circumstances |
|---|---|---|
| Method I | No change | From the 4th cycle spinning property slightly reduced. At 10th cycle, fiber breakage observed, rendering normal spinning impossible. |
| Method II | From 5th cycle, removal of iron ion from the solvent rendered difficult. Polymerization yield slightly reduced. From 6th cycle, dope transparency further reduced. | Though no particular problem occurred with spinning, from 6th cycle, whiteness of fiber reduced and the polymerization degree decreased. |
| Method III | No change | No change. |

Further, Table 8 illustrates the effects of varying the amounts of zinc oxide and oxidizing agent.

TABLE 8

| Amt. of zinc oxide | 0.3% | | 0.05% | 0.05% |
|---|---|---|---|---|
| Amt. of oxidizing agent | Hydrogen peroxide 0.2% | | Hydrogen peroxide 0.15% | Hydrogen peroxide 0.05%. |
| Frequency of treatment | 3d time | 8th time | 7th time | 4th time. |
| Problems risen | Spinning property slightly reduced. | Nozzle plugged up resulting in fiber breakage. | Transparency of polymer solution and whiteness of fiber reduced. | Removal of iron ion rendered difficult and polymerization yield reduced. |
| Concurrent characterization Value: | | | | |
| A | 1,280 | 1,350 | 1,580 | 1,500. |
| B | 400 | 420 | 460 | 550. |
| C | 630 | 1,030 | 580 | 500. |

EXAMPLE 2

A concentrated aqueous salt solution consisting of 530 parts of zinc chloride, 50 parts of sodium chloride and 420 parts of water is used as a solution polymerization medium. To said aqueous salt solution is added 89 parts of acrylonitrile, 9.5 parts of methyl acrylate and 1.5 parts of sodium allyl sulfonate. Thereafter, the original spinning solution is formed by polymerization using a redox catalyst consisting of a combination of 0.2 part of sodium persulfate and 0.6 part of sodium bisulfite and is spun out in an aqueous coagulating bath adjusted to 23 percent zinc chloride and 2 percent sodium chloride. Thereafter, an inorganic aqueous salt solution is recovered from the coagulating bath and concentrated to about 60 percent inorganic salt.

6 parts by weight of the concentrated solution in which the concentration of the basic salt is adjusted to 0.3 percent and 4 parts of the concentrated solution in which hydrochloric acid content is adjusted 0.1 percent by adjusting the degree of the basic salt content to 0 are each oxidized by use of 0.2 percent ammonium persulfate and then mixed. Thereafter, other necessary conventional purifications and adjustments are carried out, and thus solution is used again as a solution polymerization medium.

The results of repeating the aforementioned step nine times are shown in Table 9 with respect to the characterization values. No changes are observed with respect to polymerization, spinning or the finished product obtained, all being satisfactory.

TABLE 9

| | 1st time | 3d time | 5th time | 7th time | 9th time |
|---|---|---|---|---|---|
| Value: | | | | | |
| A | 1,000 | 1,020 | 1,000 | 1,000 | 1,010 |
| B | 350 | 360 | 360 | 340 | 350 |
| C | 300 | 300 | 310 | 310 | 310 |

What is claimed is:

1. In a process for producing an acrylic fiber comprising acrylonitrile including the steps of
   (a) solution polymerizing acrylonitrile in a first concentrated aqueous inorganic salt solvent solution comprising zinc chloride as the principal component,
   (b) spinning the resulting polymer solution from step (a) into a coagulating bath comprising a dilute aqueous inorganic salt solvent solution having a lower concentration of zinc than said first concentrated aqueous solvent solution to form a spun fiber,
   (c) washing the spun fiber in at least one washing bath,
   (d) recovering said concentrated solvent solution by removing said solvent solution from said coagulating bath and at least one washing bath and concentrating said removed solvent solution and
   (e) recycling the recovered concentrated solvent solution to the polymerizing solution of step (a),
   wherein organic impurities accumulate in said recovered solvent solution, the improvement comprising
   purifying the recovered solvent solution prior to recycling to reduce the amount of organic impurities present therein which adversely affect polymerization and spinning conditions and the properties of the acrylic fiber product by subjecting said recovered solvent solution prior to recycling to a combination of two oxidation steps, one of said oxidation steps being carried out upon the recovered aqueous salt solution having a basic salt concentration of above 0.1% by weight and the other of said oxidation steps being carried out upon the aqueous salt solution having a basic salt concentration of below 0.1% by weight so that the resulting purified solvent solution contains a reduced amount of organic impurities as compared to said recovered solvent solution such that the following criteria are met:
   (A) the amount of oxygen consumed when the purified solvent solution is subjected to permanganate oxidation at a high pH is less than 1,500 mg./liter;
   (B) the amount of oxygen consumed when the purified solvent solution is subjected to permanganate oxidation at a low pH is less than 500 mg./liter; and
   (C) the amount of potassium chromate consumed when the purified solvent is treated with potassium chromate is less than 600 g./liter.

2. The process of claim 1 wherein the recovered aqueous salt solvent solution is split into two fractions, prior to recycling the basic salt concentration of each fraction is adjusted to above and below 0.1%, respectively, each fraction is subjected to oxidation and then recycled to the polymerization step.

3. The process of claim 1 wherein the basic salt concentration is alternated above and below 0.1% each cycle of the process.

4. The process of claim 1 wherein the value of at least one of A, B or C is higher prior to purification than after.

5. The process of claim 1 wherein said acrylic fiber consists essentially of polyacrylonitrile.

References Cited

UNITED STATES PATENTS

| 2,902,335 | 9/1959 | Sakurai et al. | 264—38 |
| 3,558,702 | 1/1971 | Pasin et al. | 264—37 X |
| 3,284,555 | 11/1966 | Lobering | 264—182 |
| 3,284,554 | 11/1966 | Riley | 264—38 X |
| 3,107,971 | 10/1963 | Yasawa et al. | 264—38 |
| 3,133,018 | 5/1964 | Watanabe et al. | 264—38 X |
| 3,135,812 | 6/1964 | Taniyama et al. | 264—182 |

FOREIGN PATENTS

| 1,238,156 | 4/1962 | Germany | 264—37 |

PHILIP E. ANDERSON, Primary Examiner

U.S. Cl. X.R.

264—182